(12) United States Patent
Kim

(10) Patent No.: US 8,338,723 B2
(45) Date of Patent: Dec. 25, 2012

(54) DETECTING METHOD AND DEVICE FOR DETECTING TOUCH POSITION BASED ON IN-CELL TOUCH PANEL TYPE, AND FLAT PANEL DISPLAY USING THE SAME

(75) Inventor: Jinkyu Kim, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 680 days.

(21) Appl. No.: 12/558,152

(22) Filed: Sep. 11, 2009

(65) Prior Publication Data

US 2010/0212974 A1    Aug. 26, 2010

(30) Foreign Application Priority Data

Feb. 20, 2009  (KR) .......................... 10-2009-0014247

(51) Int. Cl.
*G08C 21/00*    (2006.01)
(52) U.S. Cl. ..................... 178/18.03; 345/173
(58) Field of Classification Search .......................... None
See application file for complete search history.

(56) References Cited

U.S. PATENT DOCUMENTS

2006/0170658 A1 *    8/2006    Nakamura et al. ............ 345/173

\* cited by examiner

*Primary Examiner* — Hoa T Nguyen
*Assistant Examiner* — Mark Fischer
(74) *Attorney, Agent, or Firm* — Birch, Stewart, Kolasch & Birch, LLP

(57) ABSTRACT

A method and a device for detecting a touch position and a flat panel display using the method and the device are disclosed. The touch position detecting method includes generating touch data from a touch sensor array; computing the touch data input in each of adjacent frames to generate difference data and then performing at least one binary operation and a filtering operation on the difference data to correct the difference data; determining an effective area and then calculating a first central coordinate and a second central coordinate; computing a reference vector between the first central coordinate and the second central coordinate, a position vector between a position coordinate and the second central coordinate, and an angle between the reference vector and the position vector; and determining the position coordinate on the touch boundary portion at the angle having a minimum value as a touch coordinate.

12 Claims, 16 Drawing Sheets

FIG. 2A
(Related Art)
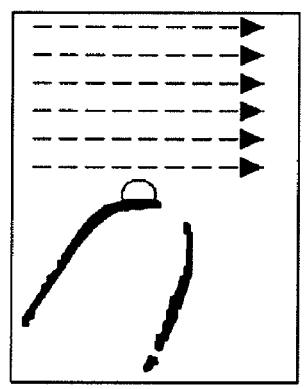
- - - → SCAN
○ touch coordinate
FIG. 2B
(Related Art)
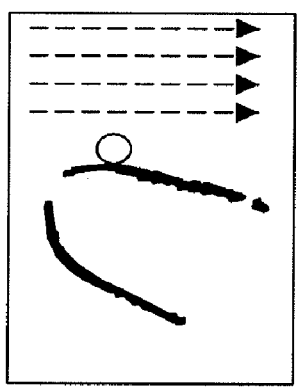 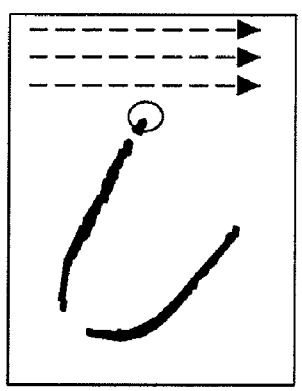
(a)　　(b)
- - - → SCAN
○ touch coordinate B1 (x1, y1)
B2 (x2, y2)
B3 (x3, y3)
B4 (x4, y4)

P1(x4, y1)
P2(x2, y3)

DETECTING METHOD AND DEVICE FOR DETECTING TOUCH POSITION BASED ON IN-CELL TOUCH PANEL TYPE, AND FLAT PANEL DISPLAY USING THE SAME

This application claims the benefit of Korea Patent Application No. 10-2009-014247 filed on Feb. 20, 2009, which is incorporated herein by reference for all purposes as if fully set forth herein.

BACKGROUND OF THE INVENTION

1. Field of the Invention

Embodiments of the invention relate to a method and a device for detecting a touch position, and more particularly, to a method and a device for detecting a touch position capable of accurately detecting touch coordinates and a flat panel display using the method and the device.

2. Discussion of the Related Art

Examples of a flat panel display include a liquid crystal display (LCD), a plasma display panel (PDP), a field emission display (FED), and an organic light emitting diode (OLED) display. Most of them have been put to practical use in electric home appliances or personal digital appliances and have been put on the market.

With a recent trend toward thin profile and lightness in weight of electric home appliances or personal digital appliances, a button switch as user's input means has been substituted for a touch sensor. Examples of the touch sensor include a capacitive touch sensor, a resistance touch sensor, a pressure touch sensor, an optical touch sensor, and an ultrasonic touch sensor, etc. As a kind of the optical touch sensor, an in-cell touch panel type touch sensor in which touch sensors are formed inside a pixel of a display device has been widely used.

The in-cell touch panel type touch sensor, as shown in FIG. 1, includes a sensor thin film transistor (TFT) differently generating a light current "i" depending on a touch or non-touch operation, a sensor capacitor Cst storing charges resulting from the light current "i", and a switch TFT outputting the charges stored in the sensor capacitor Cst. In the in-cell touch panel type touch sensor, touch data generated in the touch operation is different from touch data generated in the non-touch operation. A flat panel display can detect information about a touch position of a user's finger or a touch pen based on the touch data from the in-cell touch panel type touch sensor.

The optical touch sensor has a problem that the touch data is greatly affected by an external illuminance or a shadow. To solve the problem, an optical black method and a reference image difference method were proposed. However, the optical black method cannot remove a specific deviation of a display panel, and the reference image difference method recognizes an image on a display screen or an image reflected by a polarizing plate as a basic receiving light pattern. Accordingly, a frame difference method has been recently proposed so as to solve the problem. In the frame difference method, touch frame data input in a previous frame is subtracted from touch frame data input in a current frame to generate new difference data. Then, a meaning touch boundary portion is calculated using a determined threshold value as a parameter.

To obtain a touch coordinate required in the flat panel display, a quadratic curve of a portion corresponding to a user's fingertip has to be found among the calculated touch boundary portion. Most of quadratic curve detecting algorithms require performing a matrix operation of N×M size on image data of N×M size. In particular, a determination matrix operation, an eigenvector matrix operation, and an eigenvalue matrix operation are required. The determination matrix operation is an operation performed in an iteration manner, and the eigenvector matrix operation requires an inverse matrix. Therefore, even if a matrix operation is performed on a portion of the image data, operation time algorismically increases to infinity.

To reduce operation time required to detect the touch coordinate, an upward priority manner and an edge light amount decision manner are known.

In the upward priority manner, as shown in FIG. 2A, while the difference data is scanned from the top of the difference data in an arrow direction, a first sensed effective point (corresponding to a circle in FIG. 2A) is recognized as a touch coordinate through the user's fingertip. However, the upward priority manner may be limitedly applied only when the user's finger approaches from the bottom to the top. For example, when the user's finger approaches from the side as shown in (a) of FIG. 2B, or when the user's finger approaches from the top to the bottom as shown in (b) of FIG. 2B, the upward priority manner has a great problem in detecting the touch coordinate.

In the edge light amount decision manner, as shown in FIG. 3A, edge sensor areas are formed using touch sensors, and a priority scanning direction is determined on the assumption that if the user's finger approaches, a shadow is generated in the user's finger and thus the shadow of approaching direction is reflected in the edge sensor areas. In (a) of FIG. 3A, because an output value of a downward positioned edge sensor area is different from output values of other edge sensor areas, the difference data is scanned in an upward priority scanning manner. In (b) of FIG. 3A, because an output value of a left-handed edge sensor area is different from output values of other edge sensor areas, the difference data is scanned in a right priority scanning manner. In (c) of FIG. 3A, because an output value of a right-handed edge sensor area is different from output values of other edge sensor areas, the difference data is scanned in a left priority scanning manner. In (d) of FIG. 3A, because an output value of an upward positioned edge sensor area is different from output values of other edge sensor areas, the difference data is scanned in a downward priority scanning manner. Then, a first sensed effective point (corresponding to a circle in FIG. 3A) is recognized as the touch coordinate through the user's fingertip.

In the edge light amount decision manner, four edge sensor areas in each panel have to be initialized at the same level, so as to accurately determine a scanning direction using a deviation according to a shadow of the user's finger. However, even if the four edge sensor areas in each panel are initialized, it is very difficult to completely overcome a specific deviation between the panels, a deviation due to an external noise, a deviation according to a display image on the screen, etc. As a result, the touch coordinates may be detected from the difference data in a state of a deviation greater than the deviation according to the shadow of the user's finger.

Further, as shown in (a) of FIG. 3B, when the user's finger is over two edge sensor areas, it is difficult to detect the touch coordinate corresponding to the user's fingertip in the edge light amount decision manner. As shown in (b) and (c) of FIG. 3B, when the user's finger overlaps one edge sensor area, a wrong position may be detected as the touch coordinate by wrong determining the scanning direction.

SUMMARY OF THE INVENTION

Embodiments of the invention provide a method and a device for detecting a touch position capable of accurately detecting touch coordinates within a short period of time and a flat panel display using the method and the device.

In one aspect, there is a touch position detecting method comprising generating touch data from a touch sensor array including a plurality of touch sensors, computing the touch data input in each of adjacent frames to generate difference data and then performing at least one binary operation and a filtering operation on the difference data to correct the difference data so that only a touch boundary portion has a black gray level, determining an effective area including outermost coordinates of the touch boundary portion in upward, downward, right and left directions and then calculating a first central coordinate according to a distribution density of black points in the touch boundary portion and a second central coordinate indicating the center of the effective area, computing a reference vector between the first central coordinate and the second central coordinate, a position vector between a position coordinate on the touch boundary portion and the second central coordinate, and an angle between the reference vector and the position vector, and determining the position coordinate on the touch boundary portion at the angle having a minimum value as a touch coordinate.

In another aspect, there is a touch position detecting device comprising a touch sensor array including a plurality of touch sensors, a touch information processing unit that computes touch data input in each of adjacent frames to generate difference data and performs at least one binary operation and a filtering operation on the difference data to correct the difference data so that only a touch boundary portion has a black gray level, an effective area determining unit that determines an effective area including outermost coordinates of the touch boundary portion in upward, downward, right and left directions and calculates a first central coordinate according to a distribution density of black points in the touch boundary portion and a second central coordinate indicating the center of the effective area, a vector and angle calculating unit that computes a reference vector between the first central coordinate and the second central coordinate, a position vector between a position coordinate on the touch boundary portion and the second central coordinate, and an angle between the reference vector and the position vector, and a touch coordinate detecting unit that determines the position coordinate on the touch boundary portion at the angle having a minimum value as a touch coordinate.

In another aspect, there is a flat panel display comprising a display device including a display panel, a data drive circuit driving data lines of the display panel, a scan drive circuit driving gate lines of the display panel, and a timing controller controlling operation timing of each of the data drive circuit and the scan drive circuit and a touch position detecting device, wherein the touch position detecting device includes a touch sensor array including a plurality of touch sensors, a touch information processing unit that computes touch data input in each of adjacent frames to generate difference data and performs at least one binary operation and a filtering operation on the difference data to correct the difference data so that only a touch boundary portion has a black gray level, an effective area determining unit that determines an effective area including outermost coordinates of the touch boundary portion in upward, downward, right and left directions and calculates a first central coordinate according to a distribution density of black points in the touch boundary portion and a second central coordinate indicating the center of the effective area, a vector and angle calculating unit that computes a reference vector between the first central coordinate and the second central coordinate, a position vector between a position coordinate on the touch boundary portion and the second central coordinate, and an angle between the reference vector and the position vector, and a touch coordinate detecting unit that determines the position coordinate on the touch boundary portion at the angle having a minimum value as a touch coordinate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 2A and 2B illustrate an upward priority manner;

DETAILED DESCRIPTION OF THE EMBODIMENTS

Reference will now be made in detail embodiments of the invention examples of which are illustrated in the accompanying drawings.

Figure 1:
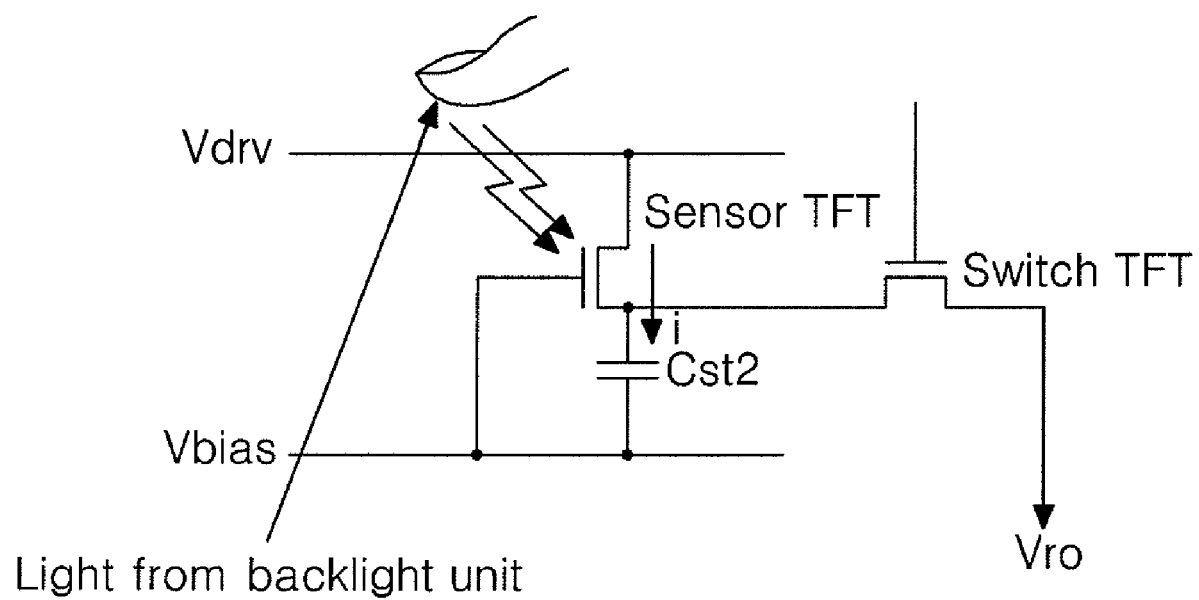
FIG. 1 is an equivalent circuit diagram of a touch sensor formed inside a pixel.
Figure 3A:
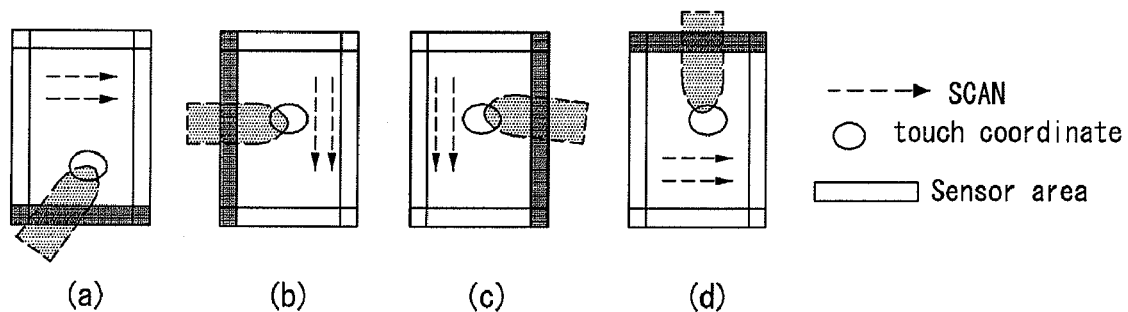
FIGS. 3A and 3B illustrate an edge light amount decision manner
Figure 3B:
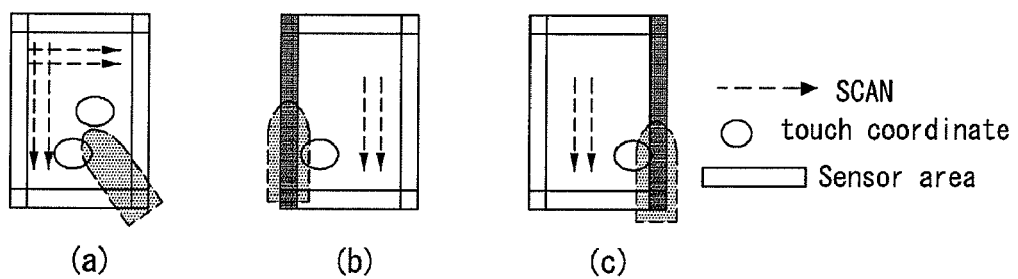
Figure 4:
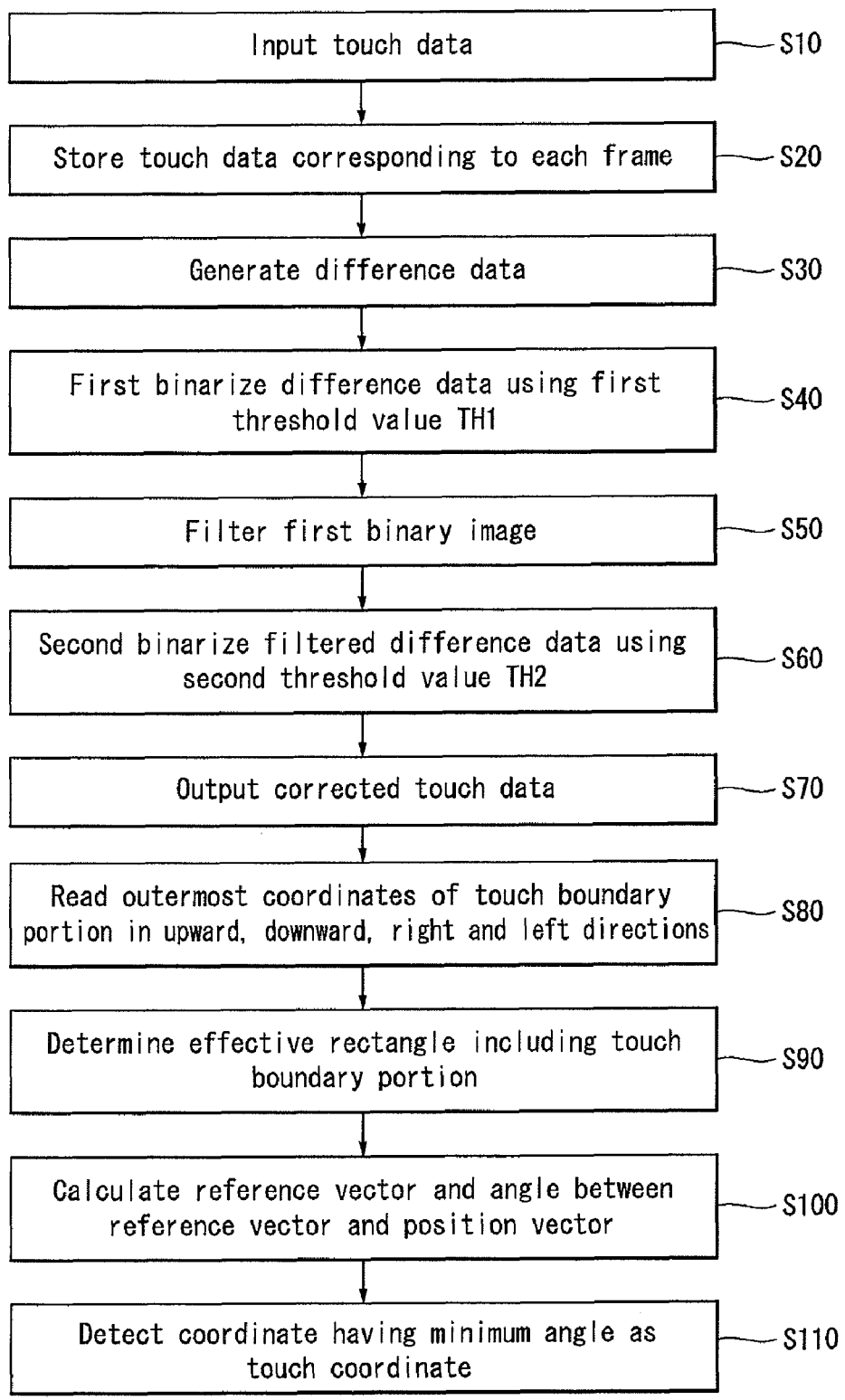
FIG. 4 is a flow chart illustrating a touch position detecting method according to an embodiment of the invention.
Figure 5:
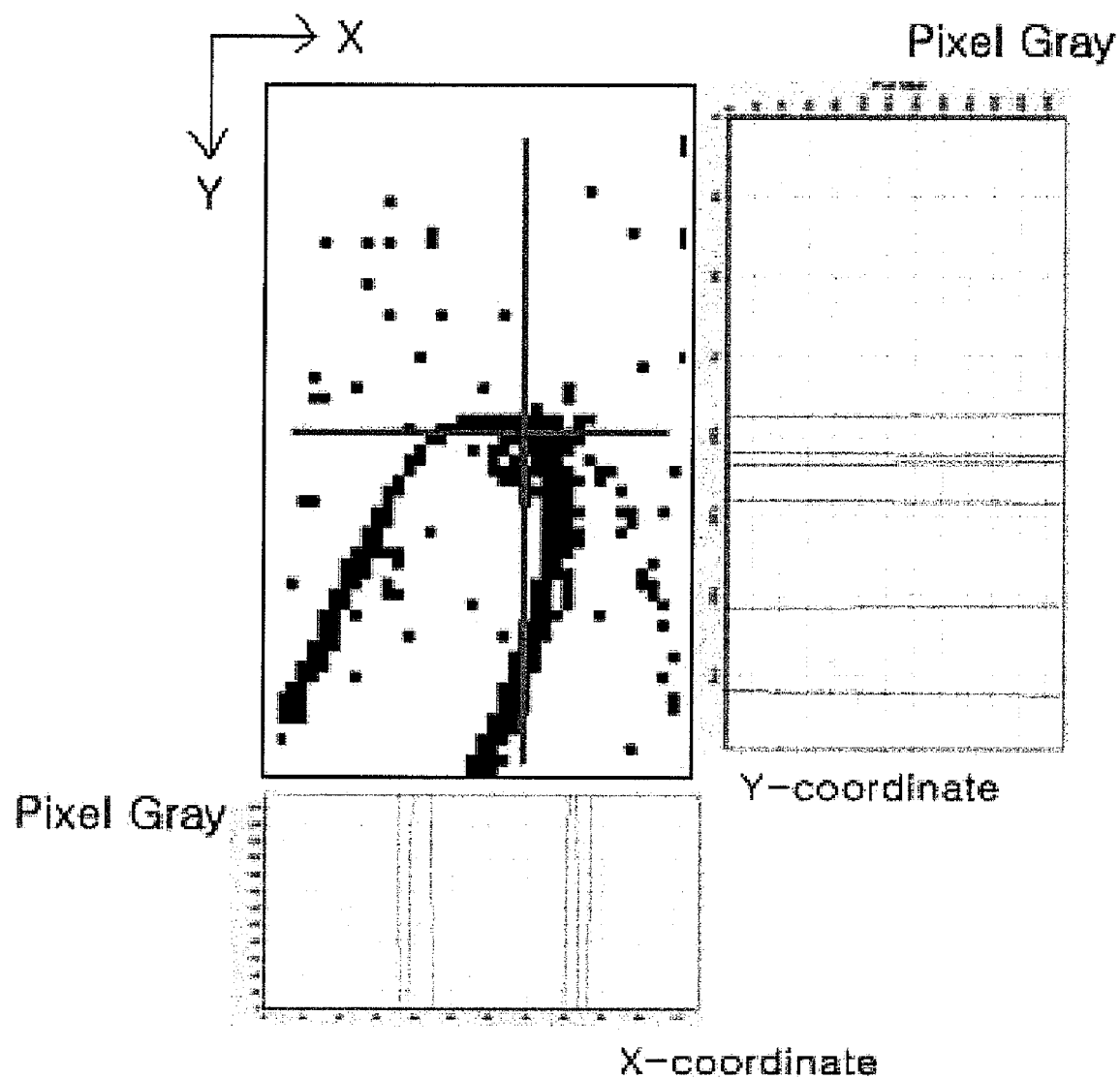
FIG. 5 illustrates a first binary image of difference data.

FIG. 4 is a flow chart illustrating a touch position detecting method according to an embodiment of the invention. FIG. 5 illustrates a first binary image of difference data.

Figure 6:
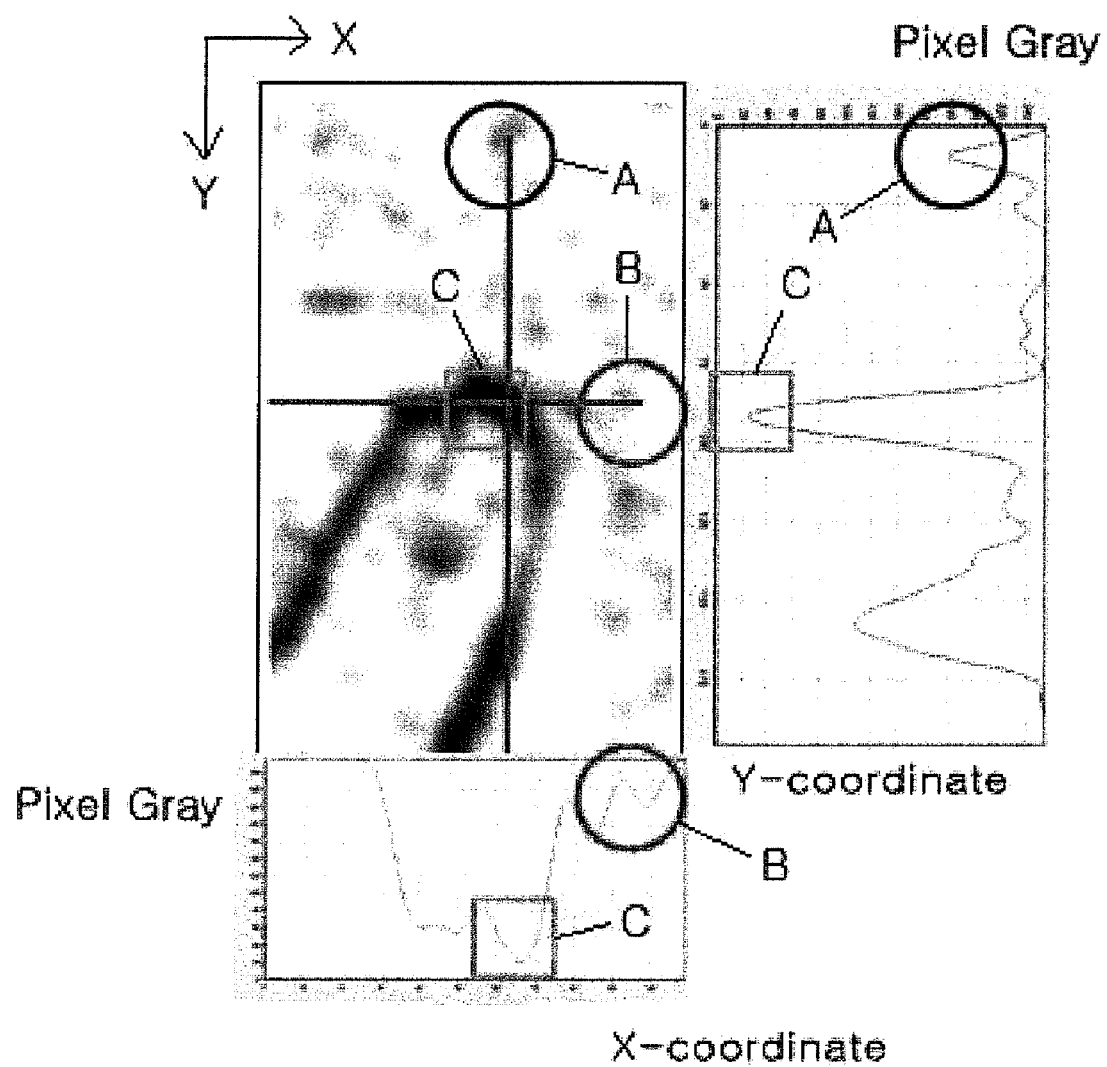
FIG. 6 illustrates an image obtained by filtering a first binary image and reflecting a spatial frequency on the first binary image.
Figure 7:
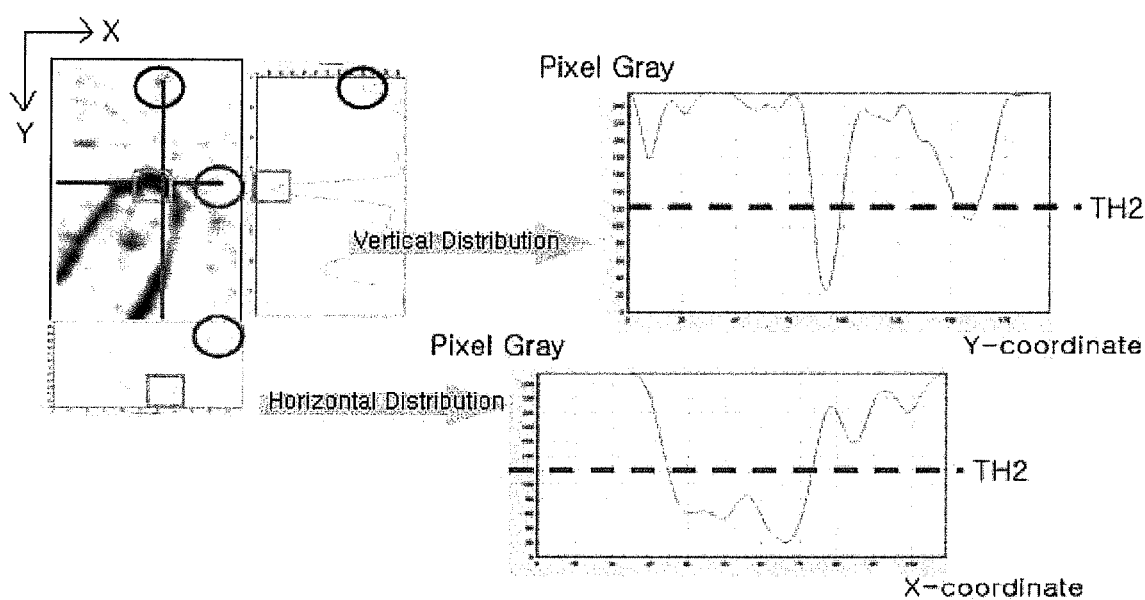
FIG. 7 illustrates a second threshold value for second binarizing an image on which a spatial frequency is reflected.
Figure 8:
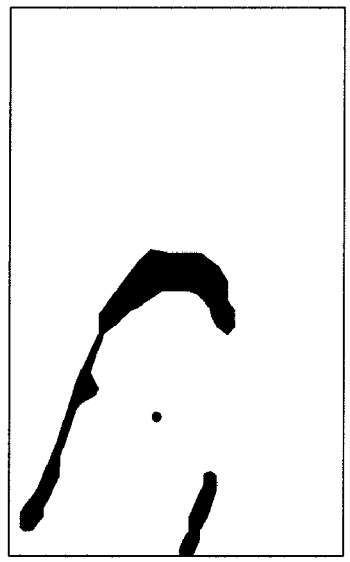
FIG. 8 illustrates a second binary image of difference data using a second threshold value.
Figure 9:
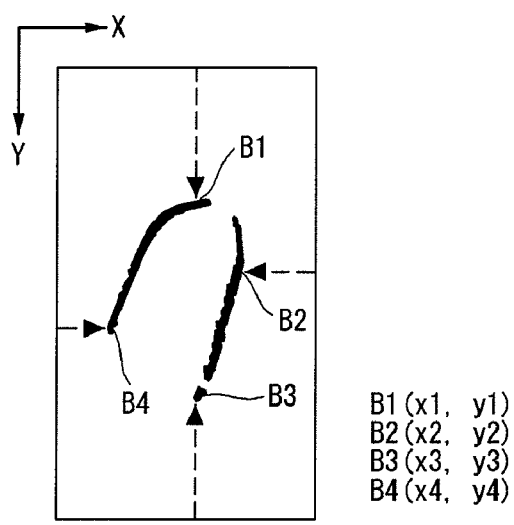
FIG. 9 illustrates a step for reading outermost coordinates of a touch boundary portion in four directions.
Figure 10:
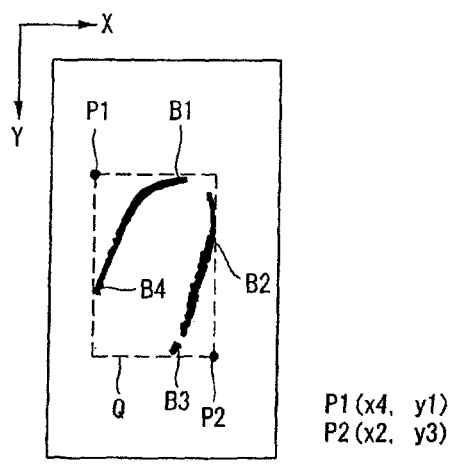
FIG. 10 illustrates a step for determining an effective rectangle including a touch boundary portion.
Figure 11:
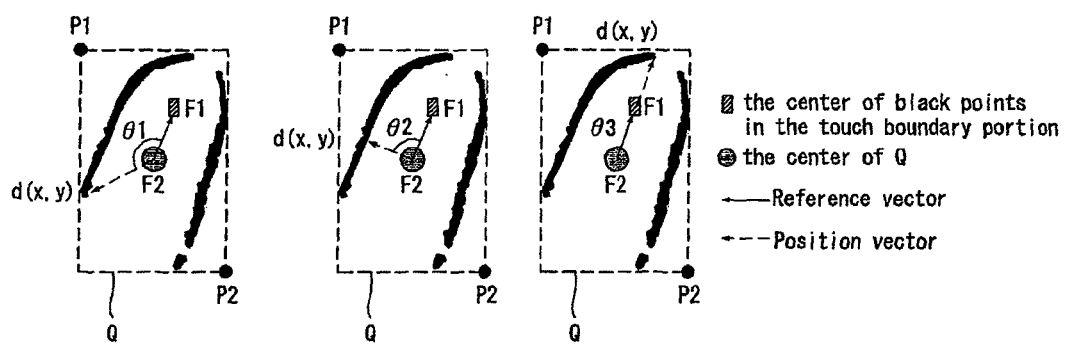
FIG. 11 illustrates a step for detecting a touch coordinate using an angle between a reference vector and a position vector.
Figure 12A:
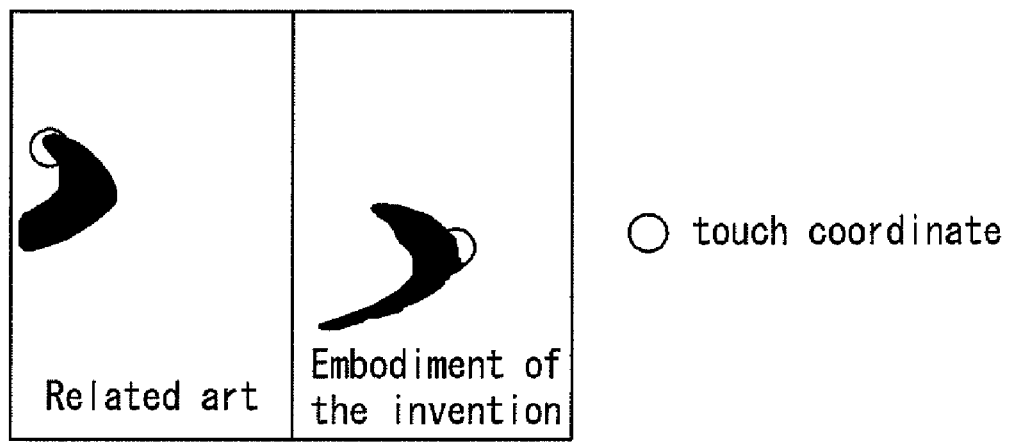
FIGS. 12A and 12B are diagrams comparing a detection result of a touch position detecting method according to an embodiment of the invention with a related art.
Figure 12B:
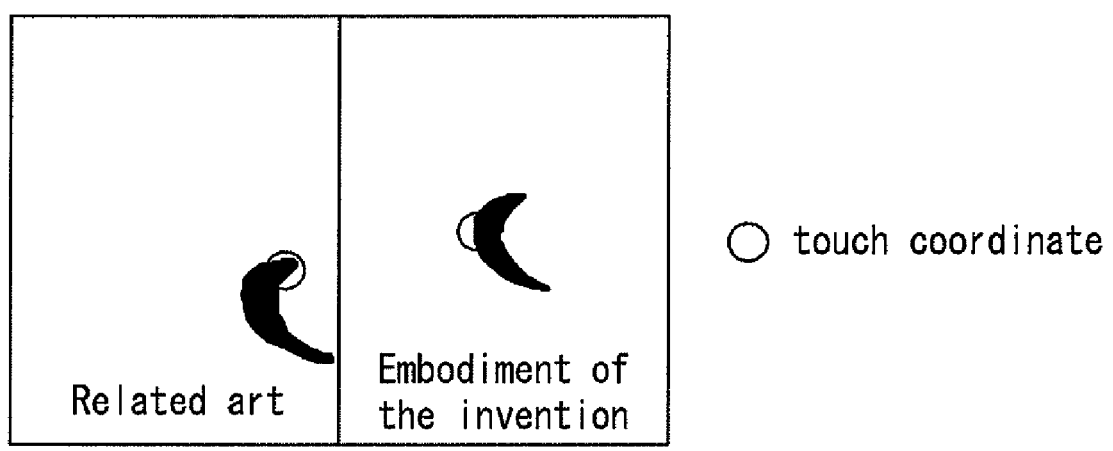

FIG. 6 illustrates an image obtained by filtering a first binary image and reflecting a spatial frequency on the first binary image. FIG. 7 illustrates a second threshold value for second binarizing an image on which a spatial frequency is reflected. FIG. 8 illustrates a second binary image of difference data using a second threshold value. In FIGS. 5 to 7, Y-axis indicates a gray level of each of difference data, and X-axis indicates X-coordinate value or Y-coordinate value of the difference data on XY-plane. FIG. 9 illustrates a step for reading outermost coordinates of a touch boundary portion in four directions. FIG. 10 illustrates a step for determining an effective rectangle including a touch boundary portion. FIG. 11 illustrates a step for detecting a touch coordinate using an angle between a reference vector and a position vector. FIGS. 12A and 12B are diagrams comparing a detection result of a touch position detecting method according to an embodiment of the invention with a related art.

A touch position detecting method according to an embodiment of the invention is described below in stages with reference to FIGS. 4 to 12B.

As shown in FIGS. 5 to 9, in a touch position detecting method according to an embodiment of the invention, if touch data generated in a touch sensor is input in step S10, the touch data corresponding to each frame is individually stored in step S20.

Next, touch frame data input in a previous frame (for example, an (N-1)-th frame) is subtracted from touch frame data input in a current frame (for example, an N-th frame) using a frame difference method to generate new difference data in step S30.

Next, as shown in FIG. 5, the new difference data is first binarized using a first threshold value TH1 as a parameter in step S40. The first threshold value TH1 may be a value previously determined by a user or may automatically vary depending on an external illuminance. For example, the first threshold value TH1 may increase in proportion to the external illuminance. When the first threshold value TH1 automatically varies depending on the external illuminance, information about the external illuminance may be obtained from a touch sensor positioned outside an effective rectangle Q of FIG. 10. Because the touch sensor positioned outside the effective rectangle Q is not covered by the user's finger, the external illuminance reflected on a touch screen may be sensed. In a first binary image shown in FIG. 5, a value of the difference data in a black portion is greater than the first threshold value TH1, and a value of the difference data in a white portion is less than the first threshold value TH1. The black portion includes a high frequency noise as well as a touch boundary line to finally obtain. First binary processing is to simply represent k-bit difference data (where k is a natural number) having gray values of 0 to $2^k$ as binary-coded digit "0" or "1", that is represented as a black gray level (i.e., gray value 0 or binary-coded digit "0") or a peak white gray level (i.e., gray value $2^k$ or binary-coded digit "1"). Hence, an efficiency of a subsequent filtering operation can increase through the first binary processing.

Subsequently, a filtering operation is performed on the first binary image in horizontal and vertical directions (i.e., transverse and longitudinal directions) using Gaussian kernel expressed by the following Equation 1 in step S50.

$$K = \frac{1}{\sqrt{2\pi}\sigma}\exp\left(-\frac{x^2}{2\sigma^2}\right) \quad \text{[Equation 1]}$$

According to an experiment, an excellent filtering effect can be obtained when "σ" in the above Equation 1 has a value of 2.5 to 3.0. A reason to filter the first binary image using Gaussian kernel is to reflect a spatial frequency generated in the filtering operation on the first binarized difference data. In other words, as shown in FIG. 6, gray levels of black points constituting the touch boundary line can be distinguished from gray levels of black points constituting the high frequency noise by reflecting a spatial distribution of the black points at each position data of a frame. In FIG. 6, data in areas "A" and "B" corresponds to the high frequency noise and is scattered in several positions. Because a black density around difference data constituting the high frequency noise is low, the difference data constituting the high frequency noise is not kept at an original black gray level "0" and increases to a first gray level equal to or greater than a middle gray level. On the other hand, because a black density around difference data corresponding to the touch boundary line in an area "C" is high, the difference data corresponding to the touch boundary line is kept at a second gray level close to the original black gray level "0". The second gray level is less than the first gray level.

Subsequently, as shown in FIG. 7, the difference data going through the filtering operation is second binarized using a previously determined second threshold value TH2 as a parameter in step 60. The second threshold value TH2 is used to remove the difference data constituting the high frequency noise and may be properly set depending on the generation frequency and the size of high frequency noise determined based on an external illuminance or a screen shape. The second threshold value TH2 has a gray level between the first gray level and the second gray level. For example, the second threshold value TH2 may be properly set within a gray level range corresponding to approximately 30% to 50% of the peak white gray level. In FIG. 7, the second threshold value TH2 was set to a gray level of 120 in consideration of a maximum gray level of 255. After going through the second binary processing, the difference data less than the second threshold value TH2 is reset to the black gray level "0", and the difference data greater than the second threshold value TH2 is reset to the peak white gray level "$2^k$". As a result, the difference data constituting the high frequency noise changes to the peak white gray level, and thus the high frequency noise is completely removed.

Subsequently, as shown in FIG. 8, corrected difference data, in which the high frequency noise is completely removed through the second binary processing, is output in step S70. As can be seen from FIG. 8, the corrected difference data has the black gray level in only a touch boundary portion and has the peak white gray level in a background portion in which the noise existed.

Subsequently, as shown in FIG. 9, outermost coordinates B1 to B4 of the touch boundary portion having the black gray level in upward, downward, right and left directions are read from the corrected difference data in step S80. More specifically, in step S80, while the corrected difference data is simultaneously scanned in the upward, downward, right and left directions, a coordinate of a position firstly sensed in each of the upward, downward, right and left directions is recognized as the outermost coordinate.

Subsequently, as shown in FIG. 10, two diagonal vertexes P1 and P2 are obtained in step S90, so as to determine the effective rectangle Q including the touch boundary portion using the outermost coordinates B1 to B4. The diagonal vertexes P1 and P2 are positioned on the line extended from the outermost coordinates B1 to B4 in a horizontal or vertical direction. In FIG. 10, the first diagonal vertex P1 is positioned on a horizontally extending line of the first outermost coordinate B1 and on a vertically extending line of the fourth outermost coordinate B4. Hence, the first diagonal vertex P1 has the same x-coordinate x4 as the fourth outermost coordinate B4 and the same y-coordinate y1 as the first outermost coordinate B1. The second diagonal vertex P2 is positioned on a horizontally extending line of the third outermost coordinate B3 and on a vertically extending line of the second outermost coordinate B2. Hence, the second diagonal vertex P2 has the same x-coordinate x2 as the second outermost coordinate B2 and the same y-coordinate y3 as the third outermost coordinate B3.

Subsequently, as shown in FIG. 11, a first central coordinate F1 according to a distribution density of black points in the touch boundary portion and a second central coordinate F2 positioned in the center of the effective rectangle Q are calculated. The first central coordinate Fl indicates the center of black points in the touch boundary portion and is determined according to a distribution density of black points in the touch boundary portion, as shown in FIG.11. The first central coordinate F1 is positioned inside the touch boundary portion. Because the distribution density of the black points corresponding to a user's fingertip is high, the first central coordinate F1 is positioned to be inclined to the user's fingertip from the second central coordinate F2. The second central coordinate F2 is subtracted from the first central coordinate F1 to obtain a reference vector, and the second central coordinate F2 is subtracted from each of coordinates of the black points of the touch boundary portion to obtain a position vector of each of the black points. Then, an angle θ between the reference vector and the position vector is obtained through the following Equation 2 in Step S100.

$$\theta = \left| \arccos\left( \frac{v(r_0) \cdot v(d_{(x,y)})}{|v(r_0)||v(d_{(x,y)})|} \right) \right|$$ [Equation 2]

In the above Equation 2, v(r0) indicates the reference vector, and v(d(x,y)) indicates the position vector.

While positions of the black points in the touch boundary portion inside the effective rectangle Q change, all of obtainable angles θ are calculated. A coordinate at the angle θ having a minimum absolute value among the calculated angles θ is detected as a touch coordinate in Step S110. As shown in FIG. 11, an angle θ3 used to detect the user's fingertip is less than the angles θ (for example, θ1 and θ2) corresponding to other black points.

As a result, as shown in FIGS. 12A and 12B, an end point of a quadratic curve can be accurately detected irrespective of a position angle of a U-shaped touch boundary line. In other words, the user's fingertip can be accurately detected irrespective of an approaching direction of the user's finger.

Figure 13:
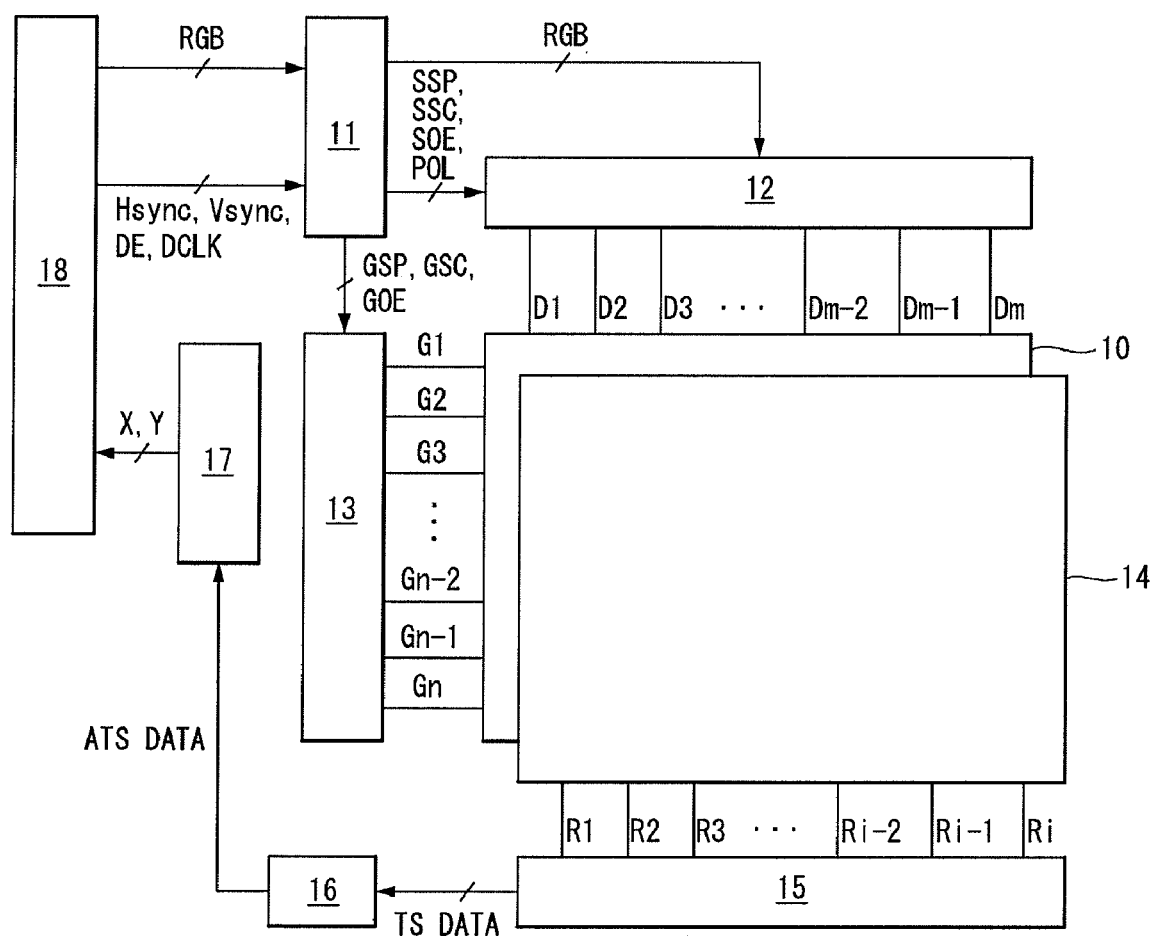
FIG. 13 is a block diagram illustrating a flat panel display according to an embodiment of the invention.

FIG. 13 is a block diagram illustrating a flat panel display according to an embodiment of the invention.

As shown in FIG. 13, a flat panel display according to an embodiment of the invention includes a display device, a touch position detecting device, and a system 18.

The display device includes a display panel 10, a timing controller 11, a data drive circuit 12, and a scan drive circuit 13. The display device may be implemented as a flat panel display such as a liquid crystal display (LCD), a field emission display (FED), a plasma display panel (PDP), and an organic light emitting diode (OLED) display. In the embodiment, the liquid crystal display will be described as the display device.

Figure 17:
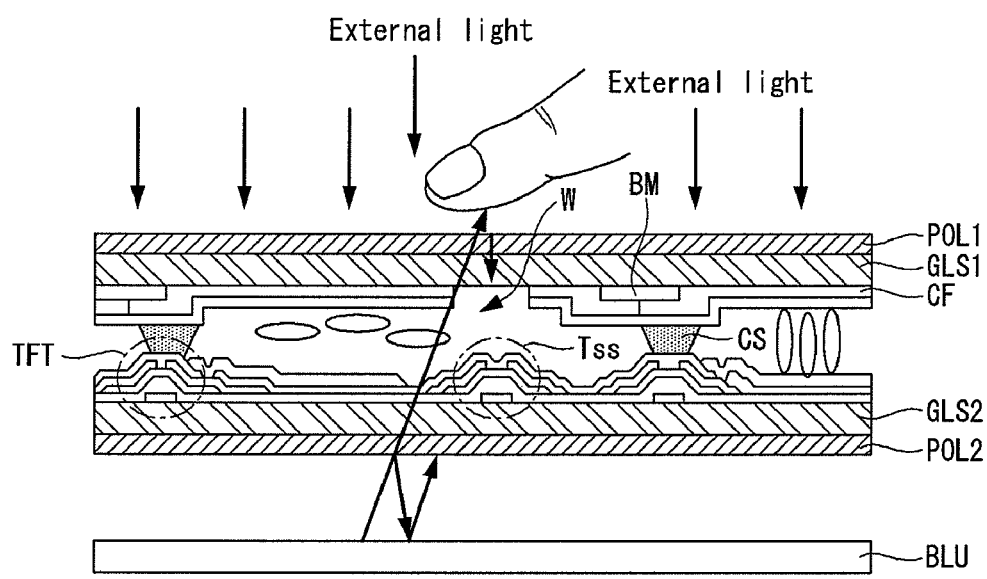
FIG. 17 is a cross-sectional view illustrating an exemplary structure of touch sensors mounted inside a pixel array of a display panel.

As shown in FIG. 17, the liquid crystal display may further include a backlight unit BLU providing light to the display panel 10. The backlight unit BLU may be implemented as an edge type backlight unit, in which light sources are positioned opposite the side of a light guide plate, or a direct type backlight unit, in which light sources are positioned under a diffusion plate.

The display panel 10 includes an upper glass substrate GLS1, a lower glass substrate GLS2, and a liquid crystal layer between the upper and lower glass substrates GLS1 and GLS2. The lower glass substrate GLS2 of the display panel 10, as shown in FIGS. 13 and 16 to 18, includes a plurality of data lines D1 to Dm, a plurality of gate lines G1 to Gn crossing the data lines D1 to Dm, a plurality of thin film transistors (TFTs), each of which is formed at each of crossings of the data lines D1 to Dm and the gate lines G1 to Gn, a plurality of pixel electrodes 1 for charging liquid crystal cells Clc to a data voltage, a storage capacitor Cst that is connected to the pixel electrodes 1 and keeps a voltage of the liquid crystal cells Clc constant, and the like. The liquid crystal cells Clc are arranged in a matrix format through a crossing structure of the data lines D1 to Dm and the gate lines G1 to Gn.

The upper glass substrate GLS1 of the display panel 10 includes a black matrix BM, a color filter CF, a common electrode 2, and the like. The common electrode 2 is formed on the upper glass substrate GLS1 in a vertical electric drive manner, such as a twisted nematic (TN) mode and a vertical alignment (VA) mode. The common electrode 2 and the pixel electrode 1 are formed on the lower glass substrate GSL2 in a horizontal electric drive manner, such as an in-plane switching (IPS) mode and a fringe field switching (FFS) mode. Polarizing plates POL1 and POL2 are respectively attached to the upper and lower glass substrates GLS1 and GSL2. Alignment layers for setting a pre-tilt angle of liquid crystals in an interface contacting the liquid crystals are respectively formed on the upper and lower glass substrates GLS1 and GSL2. A column spacer CS may be formed between the upper and lower glass substrates GLS1 and GSL2 to keep cell gaps of the liquid crystal cells Clc constant.

The timing controller 11 receives timing signals, such as a vertical sync signal Vsync, a horizontal sync signal Hsync, a data enable signal DE, and a dot clock DCLK from the system 18 to generate control signals for controlling operation timing of each of the data drive circuit 12 and the scan drive circuit 13. A control signal for controlling the operation timing of the scan drive circuit 13 includes a gate start pulse GSP, a gate shift clock GSC, a gate output enable signal GOE, and the like. A control signal for controlling the operation timing of the data drive circuit 12 includes a source start pulse SSP, a source sampling clock SSC, a source output enable signal SOE, a polarity control signal POL, and the like. The timing controller 11 controls the data drive circuit 12 and the scan drive circuit 13 and also may generate a control signal for controlling input/output operation timing of the touch position detecting device to control the touch position detecting device. The timing controller 11 rearranges digital video data RGB received from the system 18 in conformity with a resolution of the display panel 10 to supply the digital video data RGB to the data drive circuit 12.

The data drive circuit 12 includes a plurality of source drive integrated circuits (ICs). The data drive circuit 12 latches the digital video data RGB under the control of the timing controller 11 and converts the digital video data RGB into analog positive/negative gamma compensation voltage to generate an analog positive/negative pixel voltage. The data drive circuit 12 supplies the analog positive/negative pixel voltage to the data lines D1 to Dm.

The scan drive circuit 13 includes at least one scan drive IC. The scan drive circuit 13 sequentially supplies a scan pulse (or a gate pulse) to the gate lines G1 to Gn.

The touch position detecting device includes a touch sensor array 14, a readout IC 15, a touch information processing circuit 16, and a touch position detecting circuit 17.

The touch sensor array 14 includes a plurality of touch sensors connected to readout lines R1 to Ri. The touch sensor array 14 may be stacked on the display panel 10 of the display device, may be inserted inside the display panel 10, or may be formed inside a pixel array of the display panel 10 so that the touch sensor array 14 and the display panel 10 form an integral body.

The readout IC 15 supplies a driving voltage to the touch sensors of the touch sensor array 14 and converts a light current output from the touch sensors through the readout lines R1 to Ri into touch data TS DATA.

The touch information processing circuit 16 receives the touch data TS DATA from the readout IC 15, individually stores the touch data TS DATA corresponding to each frame, and generates difference data using a difference between adjacent touch frame data. Afterwards, the touch information processing circuit 16 removes a high frequency noise included in the difference data through a first binary operation using a first threshold value, a filtering operation using Gaussian kernel, and a second binary operation using a second threshold value to thereby generate a corrected touch data ATS DATA.

The touch position detecting circuit 17 performs a vector operation algorism to detect touch coordinates (X, Y) from the corrected touch data ATS DATA. More specifically, the touch position detecting circuit 17 simultaneously scans the corrected touch data ATS DATA in upward, downward, right and left directions to determine an effective rectangle including a touch boundary portion using coordinates of firstly sensed positions. The touch position detecting circuit 17 calculates a first central coordinate according to a distribution density of black points in the touch boundary portion having the black gray level and a second central coordinate positioned in the center of the effective rectangle to obtain a reference vector and a position vector of each of the black points using the first and second central coordinates. The touch position detecting circuit 17 detects a coordinate at an angle having a minimum absolute value among the calculated angles between the reference vector and the position vector as touch coordinates (X, Y).

The system 18 converts analog video data received from the outside into the digital video data RGB to supply the digital video data RGB to the timing controller 11. The system 18 extracts a composite video signal using video data, generates the timing signals Hsync, Vsync, DE, and DCLK suitable for the resolution of the display panel 10 using the extracted composite video signal, and supplies the timing signals Hsync, Vsync, DE, and DCLK to the timing controller 11. In particular, the system 18 applies the touch coordinates (X, Y) received from the touch position detecting device to a touch recognition algorism and again reflects an application result in the display device.

Figure 14:
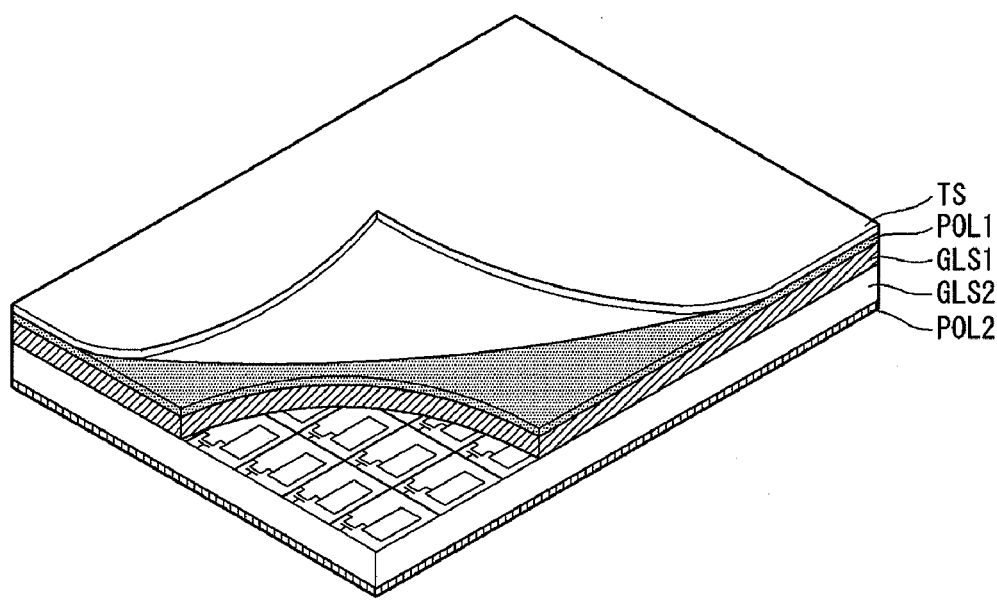
FIGS. 14 to 16 illustrate various exemplary configurations between a touch sensor array and a display panel.
Figure 15:
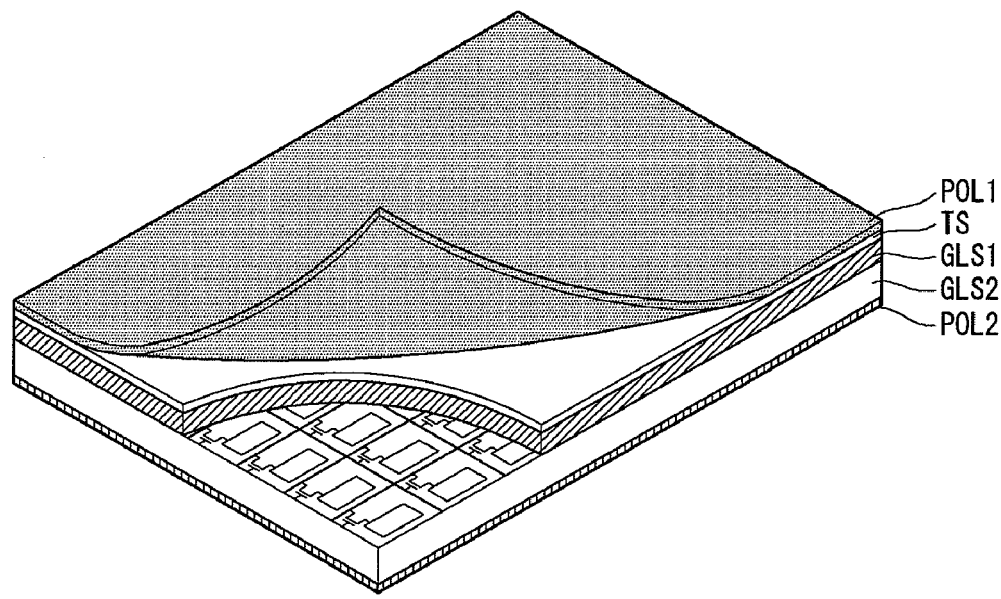
Figure 16:
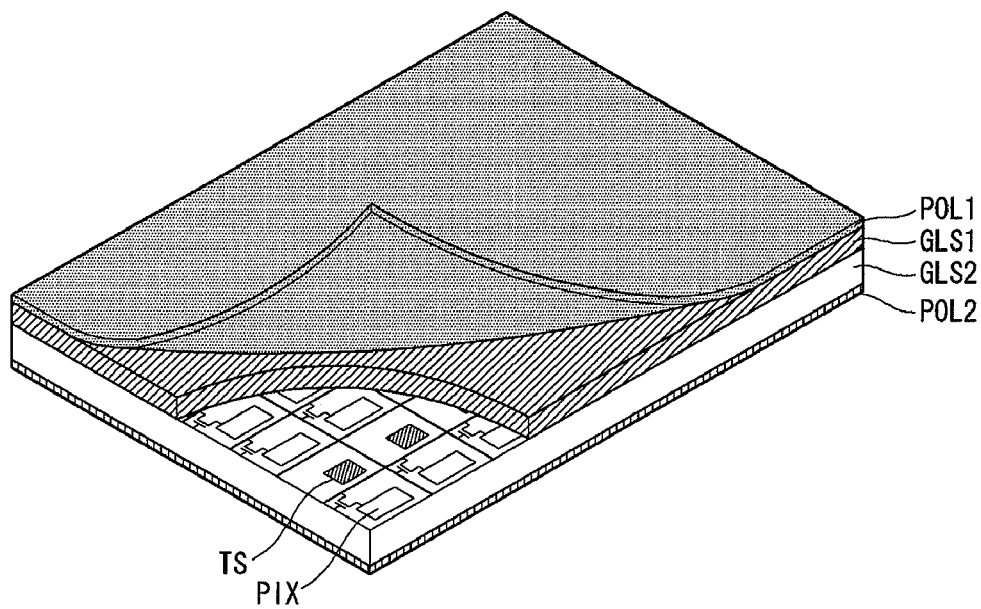

FIGS. 14 to 16 illustrate various exemplary configurations between the touch sensor array 14 and the display panel 10.

As shown in FIG. 14, the touch sensor array 14 may include a touch sensor TS stacked on the upper polarizing plate POL1 of the display panel 10. As shown in FIG. 15, the touch sensor array 14 may be mounted inside the display panel 10 and may include a touch sensor TS interposed between the upper polarizing plate POL1 and the upper glass substrate GLS1. The touch sensor array 14 in FIGS. 14 and 15 may be implemented as one of a resistance layer type touch sensor, a capacitance type touch sensor, a surface acoustic wave (SAW) type touch sensor, and an infrared type touch sensor.

As shown in FIG. 16, the touch sensor array 14 may include a plurality of touch sensors TS formed inside the pixel array of the display panel 10. The pixel array of the display panel 10 is formed on the lower glass substrate GSL2 and includes the data lines D1 to Dm, the gate lines G1 to Gn, pixel switching TFTs, the storage capacitor Cst, the pixel electrodes 1, and the like. Each of the touch sensors TS shown in FIG. 16 may include a TFT and a capacitor for detecting a sensor voltage. The TFT of the touch sensor TS and the pixel switching TFTs of the pixel array are simultaneously formed, and the capacitor of the touch sensor TS and the storage capacitor Cst are simultaneously formed.

Figure 18:
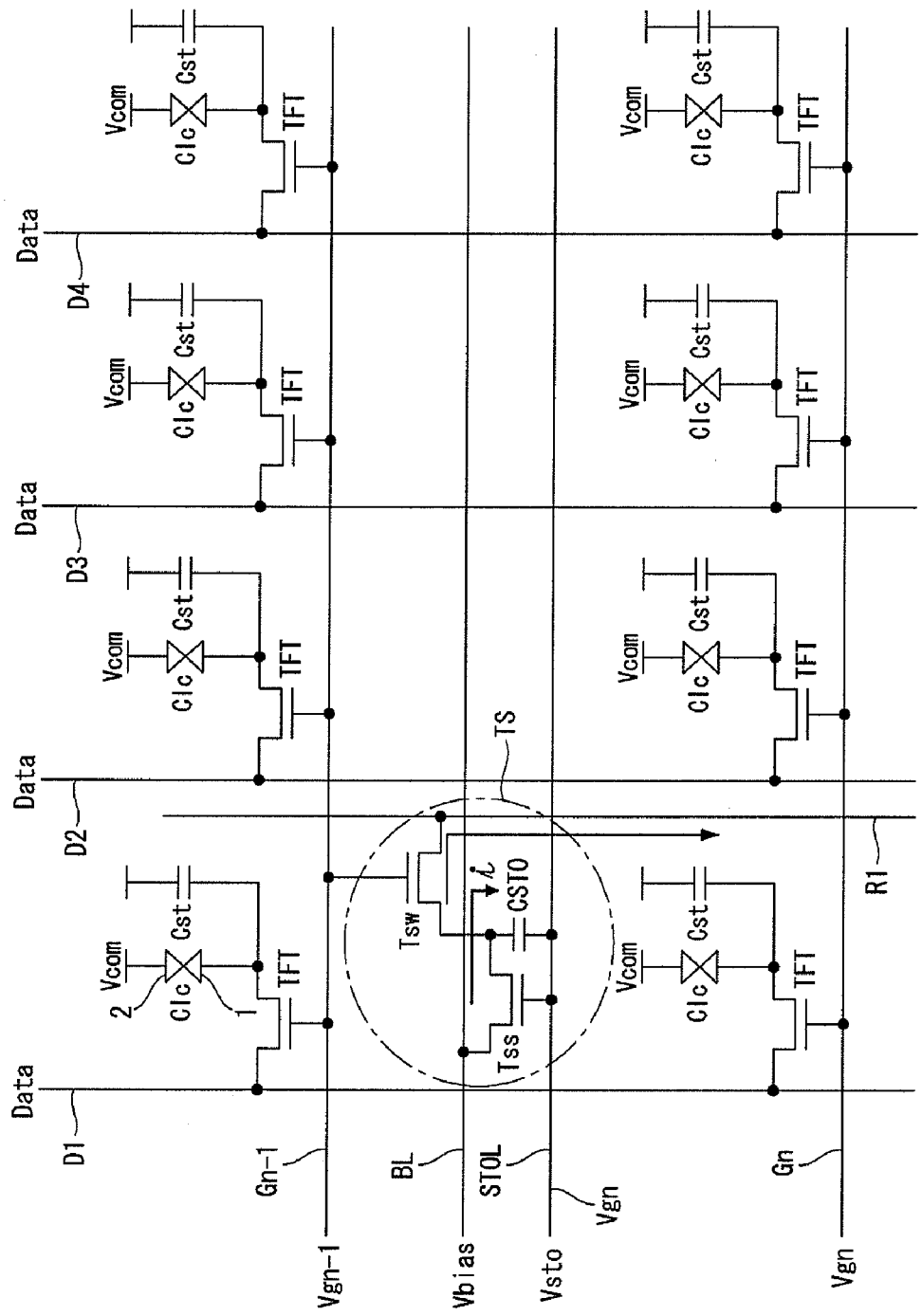
FIG. 18 is an equivalent circuit diagram illustrating an exemplary structure of touch sensors mounted inside a pixel array of a display panel.

FIG. 17 is a cross-sectional view illustrating an exemplary structure of the touch sensors mounted inside the pixel array of the display panel 10. FIG. 18 is an equivalent circuit diagram illustrating an exemplary structure of the touch sensors mounted inside the pixel array of the display panel 10. The touch sensors mounted inside the pixel array are not limited to examples illustrated in FIGS. 17 and 18 and may be embodied in many different forms.

As shown in FIGS. 17 and 18, each of the touch sensors TS may include a sensor TFT Tss, a storage capacitor CSTO, and a switching TFT Tsw.

The sensor TFT Tss opposes a transparent window W of the upper glass substrate GLS1. The black matrix BM is not formed on the transparent window W. In the sensor TFT Tss, a gate electrode is connected to a storage reference voltage line STOL and one terminal of the storage capacitor CSTO, a drain electrode is connected to a bias voltage supply line BL receiving a bias voltage Vbias, and a source electrode is connected to the other terminal of the storage capacitor CSTO and a drain electrode of the switching TFT Tsw via a first node n1. If a touch object such as a user's finger or a stylus pen is placed on the upper glass substrate GLS1 opposite the sensor TFT Tss, light from the backlight unit BLU is transmitted by the lower glass substrate GLS2, the liquid crystal layer, and the upper glass substrate GLS1. Then, the light is reflected from the touch object and is incident on a semiconductor layer of the sensor TFT Tss. The sensor TFT Tss differently generates a light current "i" depending on an amount of light incident on the semiconductor layer of the sensor TFT Tss.

While the switching TFT Tsw remains in an off-state, the storage capacitor CSTO is charged to the light current "i" generated by the sensor TFT Tss. Then, when the switching TFT Tsw is turned on, the light current "i" of the storage capacitor CSTO is discharged.

The switching TFT Tsw opposes the black matrix BM of the upper glass substrate GLS1, so that light is not irradiated to the switching TFT Tsw. The switching TFT Tsw is turned on in response to the scan pulse from the gate lines G1 to Gn. The switching TFT Tsw supplies a voltage discharged by the storage capacitor CSTO to the readout lines R1 to Ri. In the switching TFT Tsw, a gate electrode is connected to the gate lines G1 to Gn, a drain electrode is connected to the source electrode of the sensor TFT Tss and the other terminal of the storage capacitor CSTO via the first node n1, and a source electrode is connected to the readout lines R1 to Ri.

Figure 19:
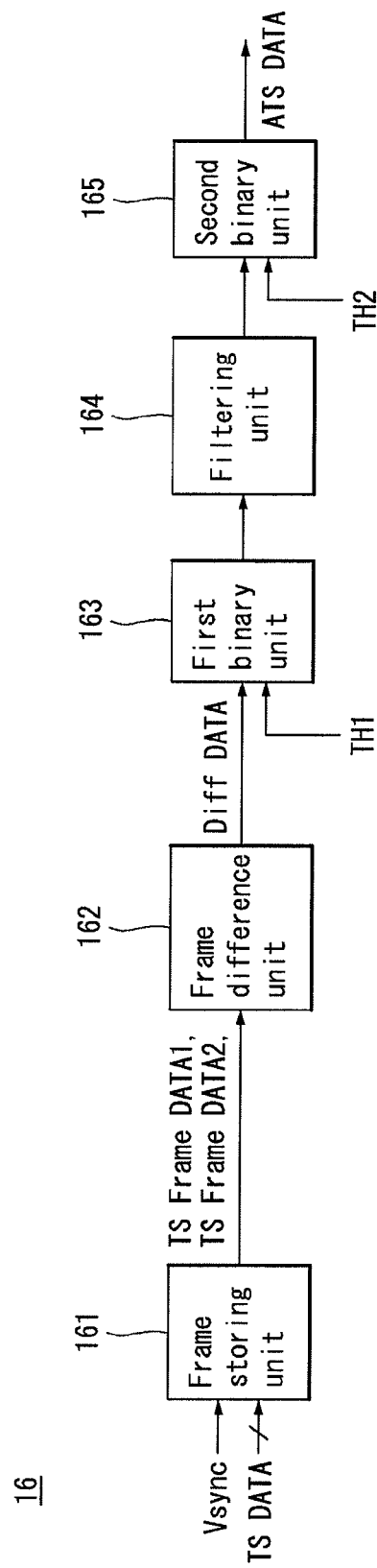
FIG. 19 is a block diagram illustrating a touch information processing circuit.

FIG. 19 is a block diagram illustrating in detail the touch information processing circuit 16.

As shown in FIG. 19, the touch information processing circuit 16 includes a frame storing unit 161, a frame difference unit 162, a first binary unit 163, a filtering unit 164, and a second binary unit 165.

The frame storing unit 161 includes two frame memories. The frame storing unit 161 receives the touch data TS DATA from the readout IC 15 and individually stores the touch data TS DATA corresponding to each frame.

The frame difference unit 162 includes a subtracting unit for comparing and subtracting touch data TS DATA input in frames. More specifically, the frame difference unit 162 subtracts second touch frame data TS Frame DATA2 input in a previous frame (for example, an (N-1)-th frame) from first touch frame data TS Frame DATA1 input in a current frame (for example, an N-th frame) to generate difference data Diff DATA.

The first binary unit 163 first binarizes the difference data Diff DATA using a first threshold value TH1 as a parameter. The first threshold value TH1 may be a value previously determined by a user or may automatically vary depending on an external illuminance. For example, the first threshold value TH1 may increase in proportion to the external illuminance.

The filtering unit 164 filters the first binarized difference data Diff DATA in horizontal and vertical directions (i.e., transverse and longitudinal directions) using Gaussian kernel. As a result, gray levels of the difference data Diff DATA around the touch boundary line can be distinguished from gray levels of the difference data Diff DATA around the high frequency noise. Because a black density around the difference data Diff DATA constituting the high frequency noise is low, the difference data Diff DATA constituting the high frequency noise is not kept at an original black gray level "0" and increases to a gray level equal to or greater than a middle gray level. On the other hand, because a black density around the difference data Diff DATA corresponding to the touch boundary line is high, the difference data Diff DATA corresponding to the touch boundary line is kept at a gray level close to the original black gray level "0".

The second binary unit 165 second binarizes the filtered difference data Diff DATA using a previously determined second threshold value TH2 as a parameter to thereby generate a corrected touch data ATS DATA. Hence, the difference data Diff DATA less than the second threshold value TH2 is reset to the black gray level, and the difference data Diff DATA greater than the second threshold value TH2 is reset to the peak white gray level. As a result, the difference data Diff DATA constituting the high frequency noise changes to the peak white gray level, and thus the high frequency noise is completely removed.

Figure 20:
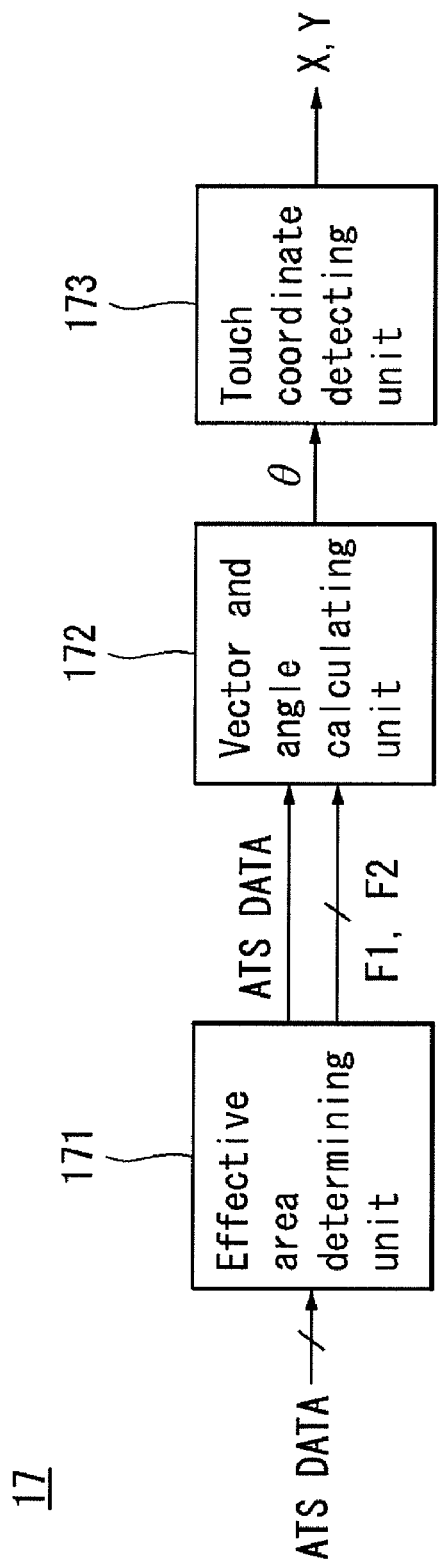
FIG. 20 is a block diagram illustrating a touch position detecting circuit.

FIG. 20 is a block diagram illustrating the touch position detecting circuit 17.

As shown in FIG. 20, the touch position detecting circuit 17 includes an effective area determining unit 171, a vector and angle calculating unit 172, and a touch coordinate detecting unit 173.

The effective area determining unit 171 simultaneously scans the corrected touch data ATS DATA in upward, downward, right and left directions to determine an effective rectangle Q including a touch boundary portion using coordinates of firstly sensed positions. The effective area determining unit 171 calculates a first central coordinate F1 according to a distribution density of black points in the touch boundary portion having the black gray level and a second central coordinate F2 positioned in the center of the effective rectangle Q.

The vector and angle calculating unit 172 subtracts the second central coordinate F2 from the first central coordinate F1 to obtain a reference vector and subtracts the second central coordinate F2 from each of coordinates of black points of the touch boundary portion to obtain a position vector of each of the black points. The vector and angle calculating unit 172 calculates an angle θ between the reference vector and the position vector using an inner product and an arccosine function of the reference vector and the position vector.

The touch coordinate detecting unit 173 detects a coordinate at the angle θ having a minimum absolute value among the calculated angles θ as touch coordinates (X, Y).

As described above, in the touch position detecting method, the touch position detecting device, and the flat panel display using the same according to the embodiment of the invention, a central coordinate according to a distribution density of black points in the touch boundary portion having the black gray level and a central coordinate positioned in the center of the effective rectangle surrounding the touch boundary portion are calculated using the touch data going through the frame difference process and the noise removing process. A reference vector and a position vector of each of black points in the touch boundary portion are obtained using the central coordinates, and then a touch boundary point at which an angle between the reference vector and the position vector has a minimum absolute value is detected as a touch coordinate corresponding to the user's fingertip. Accordingly, the user's fingertip can be accurately detected irrespective of an approaching direction of the user's finger on a touch screen.

Furthermore, in the touch position detecting method, the touch position detecting device, and the flat panel display using the same according to the embodiment of the invention, because a separate initial process in the related art edge light amount decision manner is not performed and the effective area including the touch boundary portion is detected, the touch sensor positioned in a non-effective area can be applied as an illuminance sensor.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch position detecting method comprising:
generating touch data from a touch sensor array including a plurality of touch sensors;
computing the touch data input in each of adjacent frames to generate difference data and then performing at least one binary operation and a filtering operation on the difference data to correct the difference data so that only a touch boundary portion has a black gray level;
determining an effective area including outermost coordinates of the touch boundary portion in upward, downward, right and left directions and then calculating a first central coordinate indicating the center of black points in the touch boundary portion determined according to a distribution density of the black points and a second central coordinate indicating the center of the effective area;

computing a reference vector between the first central coordinate and the second central coordinate, a position vector between a position coordinate on the touch boundary portion and the second central coordinate, and a plurality of angles between the reference vector and the position vector; and determining the position coordinate on the touch boundary portion at an angle having a minimum value among the plurality of angles as a touch coordinate.

2. The touch position detecting method of claim 1, wherein the determining of the effective area comprises while the corrected difference data is simultaneously scanned in the upward, downward, right and left directions, recognizing a coordinate of a position firstly sensed in each of the upward, downward, right and left directions as the outermost coordinates of the touch boundary portion.

3. The touch position detecting method of claim 1, wherein the first central coordinate is positioned to be inclined to a portion, having a minimum radius of curvature, of the touch boundary portion based on the second central coordinate.

4. The touch position detecting method of claim 3, wherein the reference vector is obtained by subtracting the second central coordinate from the first central coordinate,
wherein the position vector is obtained by subtracting the second central coordinate from the position coordinate on the touch boundary portion.

5. A touch position detecting device comprising:
a touch sensor array including a plurality of touch sensors;
a touch information processing unit that computes touch data input in each of adjacent frames to generate difference data and performs at least one binary operation and a filtering operation on the difference data to correct the difference data so that only a touch boundary portion has a black gray level;
an effective area determining unit that determines an effective area including outermost coordinates of the touch boundary portion in upward, downward, right and left directions and calculates a first central coordinate indicating the center of black points in the touch boundary portion determined according to a distribution density of the black points and a second central coordinate indicating the center of the effective area;
a vector and angle calculating unit that computes a reference vector between the first central coordinate and the second central coordinate, a position vector between a position coordinate on the touch boundary portion and the second central coordinate, and a plurality of angles between the reference vector and the position vector; and
a touch coordinate detecting unit that determines the position coordinate on the touch boundary portion at an angle having a minimum value among the plurality of angles as a touch coordinate.

6. The touch position detecting device of claim 5, wherein the first central coordinate is positioned to be inclined to a portion, having a minimum radius of curvature, of the touch boundary portion based on the second central coordinate.

7. The touch position detecting device of claim 6, wherein the reference vector is obtained by subtracting the second central coordinate from the first central coordinate,
wherein the position vector is obtained by subtracting the second central coordinate from the position coordinate on the touch boundary portion.

8. A flat panel display comprising:
a display device including a display panel, a data drive circuit driving data lines of the display panel, a scan drive circuit driving gate lines of the display panel, and a timing controller controlling operation timing of each of the data drive circuit and the scan drive circuit; and
a touch position detecting device including:
a touch sensor array including a plurality of touch sensors;
a touch information processing unit that computes touch data input in each of adjacent frames to generate difference data and performs at least one binary operation and a filtering operation on the difference data to correct the difference data so that only a touch boundary portion has a black gray level;
an effective area determining unit that determines an effective area including outermost coordinates of the touch boundary portion in upward, downward, right and left directions and calculates a first central coordinate indicating the center of black points in the touch boundary portion determined according to a distribution density of the black points and a second central coordinate indicating the center of the effective area;
a vector and angle calculating unit that computes a reference vector between the first central coordinate and the second central coordinate, a position vector between a position coordinate on the touch boundary portion and the second central coordinate, and a plurality of angles between the reference vector and the position vector; and
a touch coordinate detecting unit that determines the position coordinate on the touch boundary portion at an angle having a minimum value among the plurality of angles as a touch coordinate.

9. The flat panel display of claim 8, wherein the first central coordinate is positioned to be inclined to a portion, having a minimum radius of curvature, of the touch boundary portion based on the second central coordinate.

10. The flat panel display of claim 9, wherein the reference vector is obtained by subtracting the second central coordinate from the first central coordinate,
wherein the position vector is obtained by subtracting the second central coordinate from the position coordinate on the touch boundary portion.

11. The flat panel display of claim 8, wherein the plurality of touch sensors are formed inside a pixel array of the display panel.

12. The flat panel display of claim 8, wherein the plurality of touch sensors are stacked on an upper polarizing plate of the display panel or are interposed between the upper polarizing plate of the display panel and an upper glass substrate of the display panel.

* * * * *